April 30, 1935.  A. MOLLATH ET AL  1,999,250
POWER FACTOR METER FOR HIGH FREQUENCY MEASUREMENTS
Filed Aug. 31, 1933
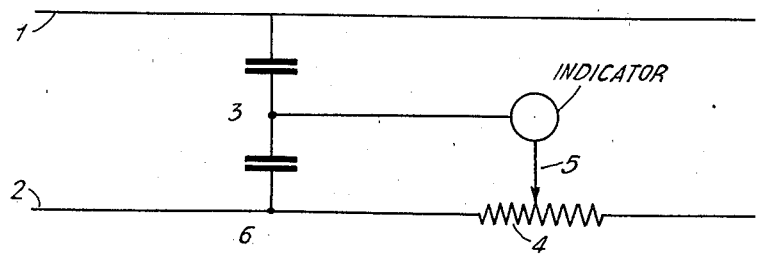
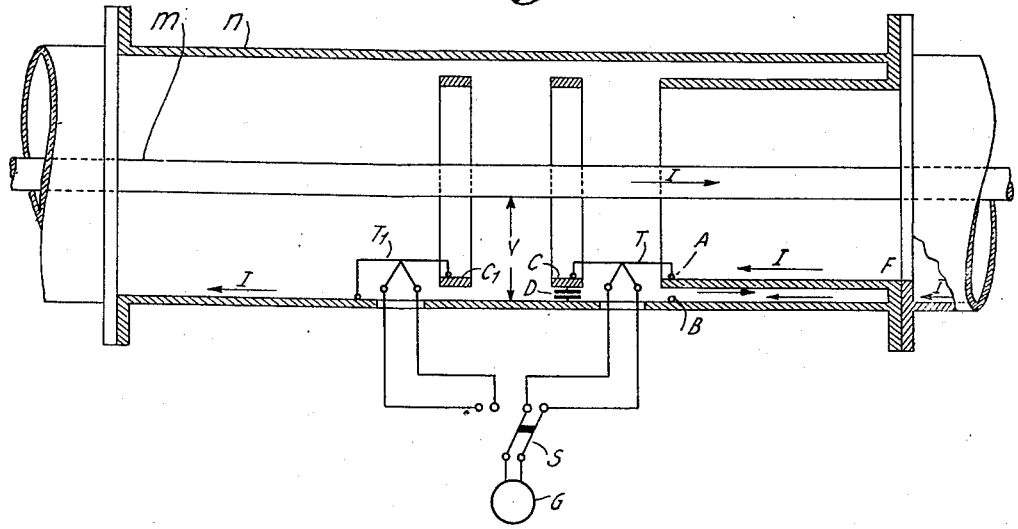
INVENTORS
H. O. ROOSENSTEIN
ARTHUR MOLLATH
BY
ATTORNEY Patented Apr. 30, 1935

1,999,250

UNITED STATES PATENT OFFICE 1,999,250

POWER FACTOR METER FOR HIGH-FREQUENCY MEASUREMENTS

Arthur Mollath and Hans Otto Roosenstein, Berlin, Germany, assignors to Telefunken Gesellschaft für Drahtlose Telegraphie m. b. H., Berlin, Germany, a corporation of Germany Application August 31, 1933, Serial No. 687,580
In Germany September 23, 1932

5 Claims. (Cl. 172—245)

The invention is concerned with an arrangement adapted to check up on the phase coincidence between an alternating current and voltage where very high frequencies are concerned. The invention shall be explained by reference to Figures 1 and 2 which show embodiments by way of example only.

Figure 1 shows the principle of the arrangement merely for purposes of discussion, although it will be understood that such an arrangement as shown in this figure is not readily adaptable to high frequencies on account of the difficulty of getting a pure, non-reactive resistance at high frequencies.

A small fraction of the voltage across the line 1, 2 is tapped off at 3. Series resistance 4 is inserted in the line and slider 5 is adjusted until the voltage drop between point 6 and the tap of slider 5 is exactly equal to the voltage drop between 6 and 3. Then, if an indicating instrument, which may be a thermocouple or a vacuum tube, is connected between points 3 and 5 no indication will result when the voltage across the line is in phase with the current in the line. Any departure from this in phase condition will make it impossible to get a zero indication for the reason that voltages of different phase cannot balance one another. This instrument may be used to give an alarm or automatically control a part of the circuit.

An arrangement in accordance with this invention as hereinafter described in connection with Figure 2 is to obtain the effect of a pure, non-reactive resistance.

Figure 2 shows a line element comprising two co-axial parts, $m$, $n$, of the lead and the return, there flowing through the said element a current J in the presence of a voltage V between the line conductors. Now, the presence of phase coincidence or "in-phase" condition between V and J is checked up by the aid of an arrangement consisting of an ohmic resistance connected between points A and B and a voltage divider; the latter preferably is designed to insure capacitive voltage division, and it may consist, e. g., of a plate C of planar, annular or other suitable shape, and a concentrated or lumped capacity D. The ohmic resistance between A and B, for example, could consist of a structure comprising a concentric tube BFA being closed at the end F. The current flows upon the internal face of the part BF, it reverses at F and flows upon the outside surface of the part FA, being again reversed at A and flowing upon the inner surface of this part. Choosing the dimensions of the piece BFA in such a way that the equation $$r_l = \sqrt{2\frac{L}{K}}$$

will be satisfied where $l$ is the length between A and F, and R and L and K, respectively, the ohmic resistance, inductance, and capacitance per unit of its length, it can be proved that the path of current A F B is free from reactance up to the highest frequencies in practical use, in fact, has a purely ohmic value $R=rl$ (see my co-pending application Serial No. 689,308, filed September 13, 1933). Under certain circumstances it may be of advantage to make the dielectric contained in the space confined between AF and BF wholly or partly of a solid or liquid material characterized by a dielectric constant which is as high as possible and low dielectric losses.

Now, if the potential prevailing at point B of the outside tube is supposed to be zero, then the voltage at the point A will be: $V_A = J.R$ where R is the ohmic resistance between points A and B. The voltage Vc of the plate C is equal to $\alpha V$, where $\alpha$ is the voltage division ratio. Between A and C is interposed an indicator such as a thermo-electric couple T which under certain circumstances will not indicate the flow of a current. This is the case when $V_A = V_C$; in other words, when $JR = \alpha V$. Then V and J will be in phase and their quotient is $$\frac{V}{J} = \frac{R}{\alpha}.$$

Arrangements of the kind as just described are useful whenever it is desired to fix the load impedance of the part of the circuit or apparatus located above a certain line element at a definite pre-arranged ohmic value $R:\alpha$, say, for the production of a pure propagating wave on an energy feed line (downlead) associated with the line element under consideration. In this case it is sufficient if the value $R:\alpha$ is made equal to the surge impedance of this line.

The invention moreover has the object of creating a measuring device for the power passing through the line element. This power N when the ratio of VJ as above described, is balanced to the ohmic value $R\alpha$ will be:

$$N = \frac{J^2 R}{\alpha}$$

or $$\frac{V^2 \alpha}{R}$$

In other words, the energy is ascertainable by a simple measurement of V or of J, seeing that both $\alpha$ and R are fixed by construction.

In the drawing is shown a switch S by the agency of which the indicator instrument G can be united either with the thermo-couple T or the thermo-couple T1. The latter is traversed by the current to the capacity plate C1 which is a measure for the voltage V. In the case of power or energy measurements the galvanometer G should preferably be calibrated to read in terms of kw.

The invention has this further object of providing a device which, upon the arising of departures from a certain pre-fixed or adjusted resistance value, automatically causes certain desirable actions to be released. Such an arrangement may turn out to be valuable in radio frequency transmitter work in order that disturbances such as might occur owing to the loss of an "adaptation" (matching), e. g., between transmitter and an energy feed line or downlead, may at once be rendered innocuous by the disconnection of the transmitter equipment.

It will be understood that the present invention is not restricted to the exemplified embodiment hereinbefore cited. The said line element which is shown in the drawing in the form of a concentric line part could also consist of a double or twin wire line. Instead of a structure as hereinbefore suggested for the ohmic resistance designed for high frequencies there could also be employed any other form of construction.

We claim:

1. A high frequency measuring circuit having, in combination, a line comprising two coaxial concentric conductors one within the other, a non-reactive resistance in the form of a concentric tube connected to said outer conductor, a voltage divider comprising a lumped capacity coupled to said outer conductor, and a connection including an indicator coupled between said resistance and said voltage divider for measuring phase relations between the voltage across said line and the current in said line.

2. A high frequency measuring circuit having, in combination, a line comprising two coaxial concentric conductors one within the other, a non-reactive resistance in the form of a concentric tube within and connected to said outer conductor, a voltage divider in the form of an annular member within said outer conductor and having a lumped capacity coupled between the outer surface of said member and the inner surface of said outer conductor, and a connection including an indicator coupled between the inner surface of said resistance and the inner surface of said annular member for measuring phase relations between the voltage across said line and the current in said line.

3. A high frequency measuring circuit having a two conductor line, a non-reactive resistance in series with one of said conductors, a capacitive voltage divider across said line, and a measuring device coupled between a point on said non-reactive resistance and said voltage divider.

4. An arrangement for the control of phase coincidence between the current and voltage in a two conductor line comprising a capacity voltage divider bridging said line, a non-reactive resistance in circuit with one conductor of said line, and arranged to be traversed by the current in the line, and a connection having a meter in circuit therewith between a point on said capacitive voltage divider and said resistance whereby the meter indicates absence of phase coincidence between the line voltage and the line current.

5. A high frequency measuring circuit having a two conductor line, a non-reactive resistance in series with one of said conductors, a reactive voltage divider across said line, and a measuring device coupled between a point on said non-reactive resistance and said voltage divider.

HANS OTTO ROOSENSTEIN.
ARTHUR MOLLATH.